United States Patent

[11] 3,609,004

| [72] | Inventor | George William Taylor |
| | | Princeton, N.J. |
| [21] | Appl. No. | 729,067 |
| [22] | Filed | May 14, 1968 |
| [45] | Patented | Sept. 28, 1971 |
| [73] | Assignee | RCA Corporation |

[54] LIGHT DEFLECTION SYSTEM
5 Claims, 3 Drawing Figs.

[52] U.S. Cl. .................................................. 350/160,
350/312
[51] Int. Cl. .................................................. G02f 3/00
[50] Field of Search ........................................... 356/246,
208, 201, 128, 134; 350/312, 160, 285; 73/290, 293

[56] References Cited
UNITED STATES PATENTS
3,263,554  8/1966  Pickels ........................... 356/246

| 3,368,862 | 2/1968 | Dean | 350/312 |
| 3,424,515 | 1/1969 | Risk | 350/312 |
| 3,028,035 | 4/1962 | Leong | 350/179 |
| 3,130,923 | 4/1964 | Goodbar | 350/285 |
| 3,303,276 | 2/1967 | Haeff | 350/285 |
| 3,442,191 | 5/1969 | Harvey | 350/285 |
| 3,493,290 | 2/1970 | Traub | 350/180 |

Primary Examiner—William L. Sikes
Attorney—H. Christoffersen

ABSTRACT: Apparatus for selectively deflecting a light beam into one of a plurality of beam paths by selectively changing the effective optical path of the beam through a refractive transparent fluid. A first embodiment selectively varies the quantity of fluid traversed by the light beam. Other embodiments use the combined refractive effect of transparent fluids in adjacent transparent fluid chambers to position a light beam.

INVENTOR
GEORGE W. TAYLOR
BY H. Christoffersen
ATTORNEY

3,609,004

LIGHT DEFLECTION SYSTEM

BACKGROUND OF THE INVENTION

Fluid-operated logic devices, such as fluid amplifiers, have some inherent operational advantages over their electronic and mechanical counterparts. These advantages are insensitivity to shock, temperature and radiation coupled with a low-cost construction using modern etching techniques. One area of use of fluid device is in light beam deflection systems particularly in controlling coherent light for selectively reading a hologram memory. Similarly, ordinary light may be selectively positioned to read a so-called photographic memory using data bits stored on film and to page-compose, i.e., write, on a light responsive medium, e.g., film.

SUMMARY OF THE INVENTION

The illustrated embodiments of the present invention are directed to a light-deflecting system using a variable light refractive characteristic produced by either varying the light lengths through a refractive fluid or presenting to a light beam a succession of transparent fluid volumes using separate fluids having corresponding refractive indices. One embodiment uses a matrix of separate X and Y fluid channels having transparent operative intersections. A combined refraction of a traversing light beam by a fluid at a matrix intersection in both of a selected X and Y channel directs the light beam into an aperture on a generally opaque plate while singly refracted or unrefracted light beams are stopped by the opaque area of the aperture plate. In another embodiment, an output location of a light beam is varied by changing the length of the fluid path for the light beam. By combining a first and a second beam deflector, the product of their separate light deflection capabilities is available. For example, an X-Y deflection system has a first and a second light beam deflector producing a beam deflection along two axes.

DETAILED DESCRIPTION

Figure 1:
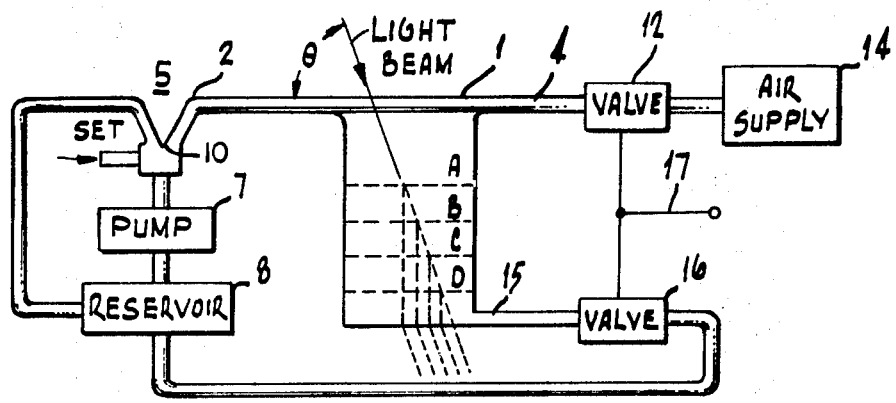
FIG. 1 is a pictorial illustration of a light-deflection system embodying the present invention.

In FIG. 1, there is shown a light-deflecting system embodying the present invention and having a transparent fluid container 1. The upper part of the container 1 has a pair of inlet conduits 2,4. A first inlet 2 is connected to an output channel of a fluid control device, shown as a fluid amplifier 5. A pump means 7 supplies a fluid from a reservoir 8 to the fluid input channel of the fluid amplifier 5. A second fluid output channel of the fluid amplifier 5 is connected back to the reservoir 8. The internal flow splitter 10 of the fluid amplifier 5 may be offset, as shown, to provide monostable operation of the fluid amplifier 5 in a manner well known in the art. A control input channel "set" is connected to any suitable source of control signals (not shown) for controlling the fluid flow through the fluid amplifier 5.

A second inlet 4 to the container 1 is connected through a first valve means 12 to a source of pressurized air, shown as air supply 14. An outlet line 15 located at the other end of the container 1 from the inlets 2 and 4 is connected through a second valve means 16 to the reservoir 8. A valve control signal is supplied on a common line 17 connected to the valve means 12 and 16 from any suitable source (not shown) to control the opening of the valve means 12 and 16. The valve means 12 and 16 may be any suitable fluid, i.e., air, control devices, e.g., fluid amplifiers.

In operation, the light-deflecting apparatus of FIG. 1 is supplied with an incident light beam entering the inlet end of the container 1 at an angle $\theta$. The container 1 is filled by the fluid amplifier 5 to a level dependent on the duration of the "set" input signal applied to the fluid amplifier 5. The various fluid levels are shown in exemplary form as levels A, B, C, and D. At the end of the "set" signal to the monostable amplifier 5, the fluid stream in the amplifier automatically switches to the output conduit leading to the reservoir 8. The illustrative four fluid levels A to D and the absence of fluid in the container 1 produce five output positions of the light beam due to the differing refraction of the light beam producing by the corresponding fluid level. Thus, the length of the optical channel for a particular liquid having a fixed refractive index produces a directly proportional change in the refracted path of the light beam. If the liquid levels are selected to be simple multiples of a first level, then the output positions of the light beam are correspondingly equally spaced. The valves 12 and 16 are concurrently opened to quickly clear the container 1 of any fluid by using the air from the air supply 14 to force the fluid into the reservoir 8 via valve 16.

An alternative to the illustrated embodiment of FIG. 1 may include using several fluids having different refractive indices. The fluids could be introduced into the container 1 by corresponding fluid amplifiers and exhausted into a common reservoir by the aforesaid operation of the air supply 14 and valves 12 and 16. A further modification would be to use separate adjacent transparent chambers to provide a common path for an incident light beam. The chambers could be selectively filled either with corresponding fluids having different refractive indices or with the same fluid and the dimensions of each chamber arranged in a predetermined fashion. In either case, the chambers could each be either entirely filled or entirely empty to provide a binary type of light beam deflection operation for each chamber. On the other, a partial filling of each chamber would produce a combined operation similar to that shown in FIG. 1.

Figure 2:
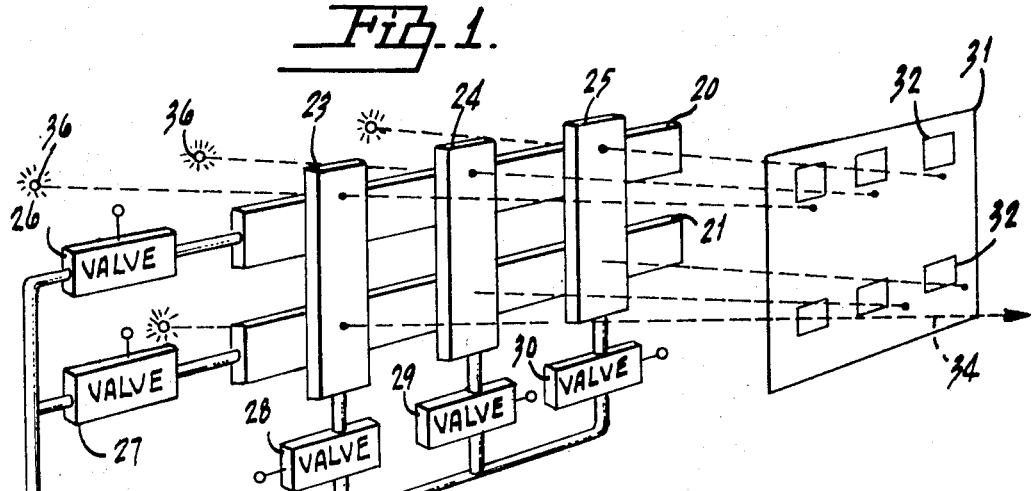
FIG. 2 is a pictorial illustration of another embodiment of the present invention.

A simplified illustration of a light deflection system using adjacent separate fluid chambers and a common fluid is shown in FIG. 2 in the form of a light-deflecting matrix. A pair of parallel X-axis fluid chambers 20, 21 are positioned adjacent to three parallel Y-axis fluid chambers 23, 24, 25 to form a matrix having operative intersections at the crossover points of the X and Y fluid chambers. Separately energizable fluid valve means, e.g., fluid amplifiers, 26, 27, 28, 29, and 30 are connected between respective ones of the X and Y fluid chambers 20, 21 and 23 to 25, and a fluid pump means 37. The pump means 37 supplies a fluid to the valve means 26 to 30 from a fluid reservoir 39. Fluid outlets (not shown) from the X and Y fluid chambers are returned to the reservoir 39. While the fluid portion embodiment of FIG. 2 has been shown in simplified form, it is understood that an arrangement of a fluid amplifier and a fluid chamber emptying means similar to that shown in FIG. 1 could be used advantageously to increase the response speed of the fluid matrix.

The intersections of the matrix are each illuminated by a corresponding light source, shown as light sources 36. A generally opaque aperture plate 31 is located on the other side of the matrix from the light sources 36. A plurality of apertures 32 in the plate 31, equal in number to the intersections of the matrix. The light sources 36 provide parallel beams of light, traversing the matrix at an angle which produces a normal beam path for each light beam through the empty X and Y chambers of the matrix to the opaque portions of the aperture plate 31. The introduction of a fluid by the appropriate valves 26 to 30 into a selected X and Y chamber produces a refractive deflection of the light beams passing through the selected chambers. However, only at the intersection of the selected X and Y chamber is the double refractive deflection sufficient to bend the light beam into a path passing through one of the apertures 32 as shown by the light beam 34. Thus, the apparatus of FIG. 2 selectively directs a light beam through one of the apertures 32 by the selective operation of the valve means 26 to 30.

Figure 3:
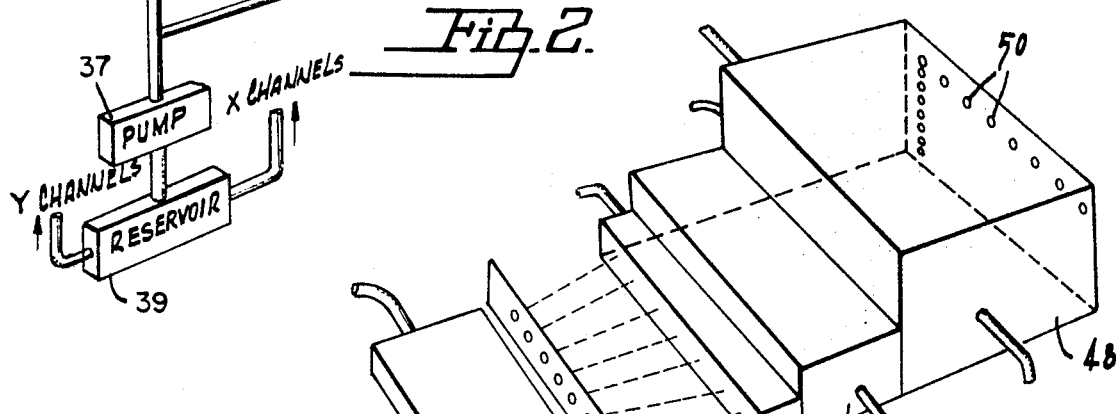
FIG. 3 is a pictorial illustration of still another embodiment of the present invention.

In FIG. 3, a third embodiment is shown using separate transparent chambers having a progressively varying chamber width, or thickness in the direction of a transitory light beam and using a common fluid. The details of the fluid system for filling and emptying the chambers have been omitted for the sake of clarity. A first group of adjacent transparent fluid chambers 40, 41, 42 have widths which progressively increase as a predetermined multiple of the first chamber 40. For example, if the width of the first chamber 40 is W, then, the width of the second chamber 41 is 2W and that of the third chamber 42 is 4W. The chambers 40 to 42 are each operated in binary fashion, i.e., filled or empty, to deflect an incident light into one of the two positions. Accordingly, the combination of the three chambers 40 to 42 produces eight possible output light beam positions. An aperture plate 44 may be used at the output side of the third chamber 42 to further define the output light beam and to block the output light beam during the transitions between final positions.

A second group of adjacent transparent fluid chambers 46, 47, and 48 are similarly arranged to have progressively varying widths in the light beam direction. The length of each of these chambers 46 to 48 accommodates all of the beam output positions from the first group of fluid chambers 40 to 42. The common angle of incidence of the output light beams from the first group of fluid chambers 40 to 42, produces a normal beam path, i.e., through empty chambers, through the second set of fluid chambers 46 to 48 to position the beams along a first line on the light exit side of the third chamber 48. Since the second group of fluid chambers 46 to 48 can, also move the transitory light beams into eight different positions, the entire line of exit beams from the third chamber 48 can be positioned in eight different positions, or levels. Thus, a total of 64 locations, shown partially as spots 50 can be selected by the combined effect of the two groups of fluid chambers to produce an X-Y light deflection system. It should be noted that while the system in FIG. 3 has been shown using common fluid and different width chambers, the reverse arrangement of a plurality of common width chambers and different refractive index fluids would produce a similar beam deflection operation. Further, a variable density output plate could be utilized to accommodate all possible positions of the light beam to produce corresponding variations in output light intensity, rather than just a binary, i.e., on-off type of operation.

What is claimed is:

1. In a matrix for controlling the path taken by incident radiant energy, the combination comprising:
    a first group of fluid channels formed of transparent material and lying adjacent and substantially parallel to one side of an imaginary plane, said radiant energy being incident on said channels on the side of said channel opposite said plane;
    a second group of fluid channels formed of transparent material, crossing the first group of fluid channels, and lying adjacent and substantially parallel to the other side of said plane, the channels of said second group extending at an angle to those of said first group, each region of the matrix where a fluid channel of the first group crosses, that is, lies next to a fluid channel of the second group comprising an area through which incident radiant energy may pass; and
    means for selectively choosing, for each of said areas through which incident radiant energy may pass, one of four possible paths for said incident radiant energy comprising means for selectively filling with fluid transparent to said radiant energy at least one channel in each group.

2. The combination claimed in claim 1, wherein said first group of fluid channels extend in one direction and said group of second fluid channels extend in a second direction at an angle of substantially 90° to the first direction.

3. The combination claimed in claim 1, including an opaque aperture plate lying substantially parallel to said plane and on the other side of said second group of fluid channels from said plane, said aperture plate having a transparent window for each region of the matrix where said first and second group of fluid channels lie next to each other, said transparent windows being located to receive from the respective channel crossovers only light traversing a selected one of said four possible paths.

4. In a matrix for controlling the path taken by a beam of radiant energy, in combination:
    a group of transparent fluid channels lying side by side in succession along a plane, and aligned along an optical axis to provide a path through all of said channels to a beam incident on the first channel along said plane in a direction transverse the channels, each of said channels having its dimension along the optical axis different from that of each of the other channels;
    means for substantially completely emptying selected ones of said channels; and
    means for substantially completely filling all other ones of said channels with a fluid, transparent to said radiant energy for selecting which of a plurality of paths through said channels said beam will traverse.

5. The combination as claimed in claim 4 further including:
    a second group of transparent fluid channels lying side by side in succession along a second plane and aligned along an optical axis to provide a path through all of said channels to a beam incident on the first channel along said second plane in a direction transverse the channels, the first of said second group of fluid channels facing the last of the first-mentioned group of fluid channels and positioned to receive any beam of radiant energy emerging from the last of said first-mentioned group of fluid channels; and
    means for selectively filling said second group of channels with fluid transparent to said radiant energy for selectively choosing one of a plurality of paths along said second plane which the radiant energy, applied to said first channel of said second group, may take.